C. S. BUCKLIN.
HAND PACK FILLING MACHINE.
APPLICATION FILED JULY 1, 1918.
1,335,819.
Patented Apr. 6, 1920.
2 SHEETS—SHEET 2.
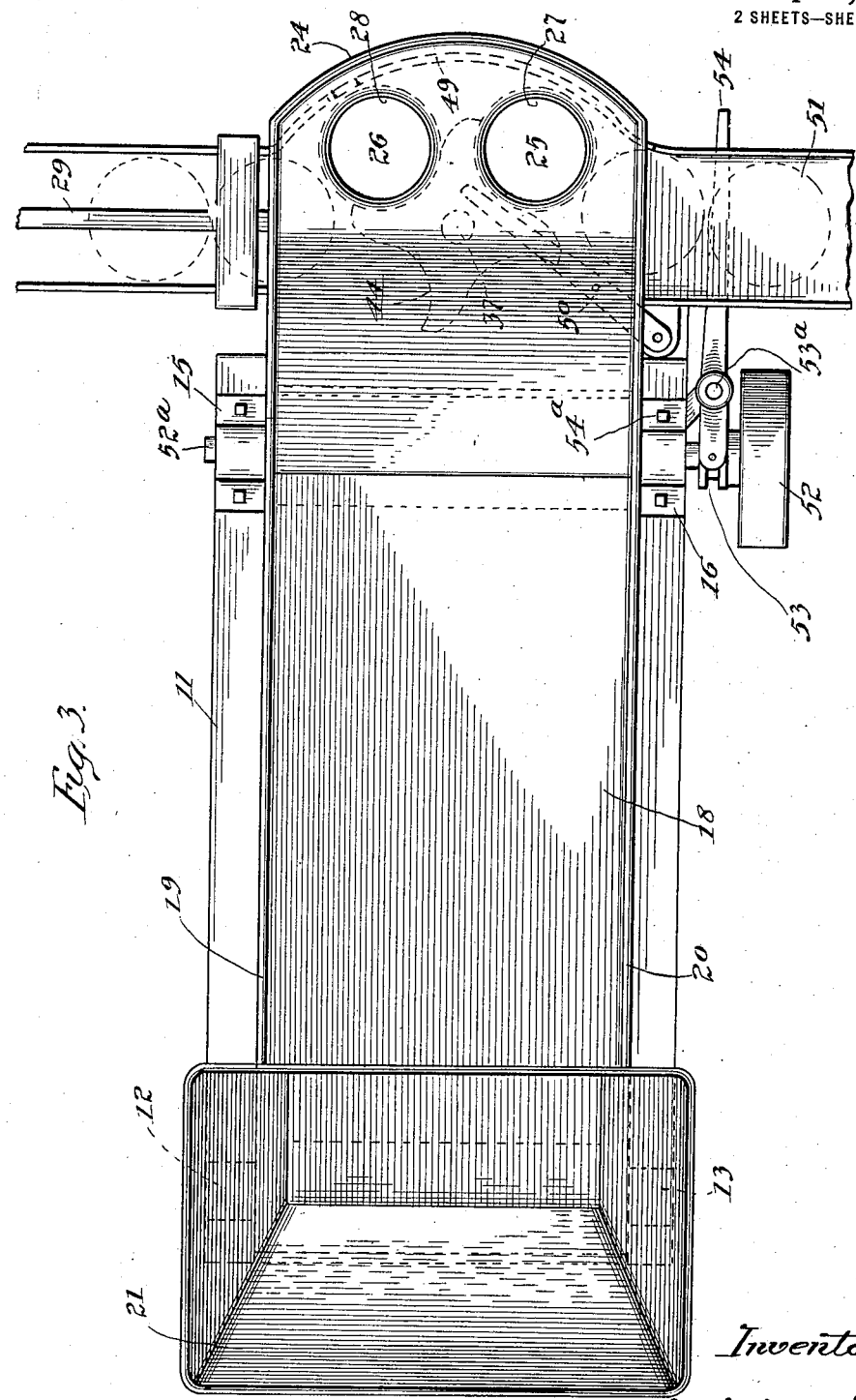

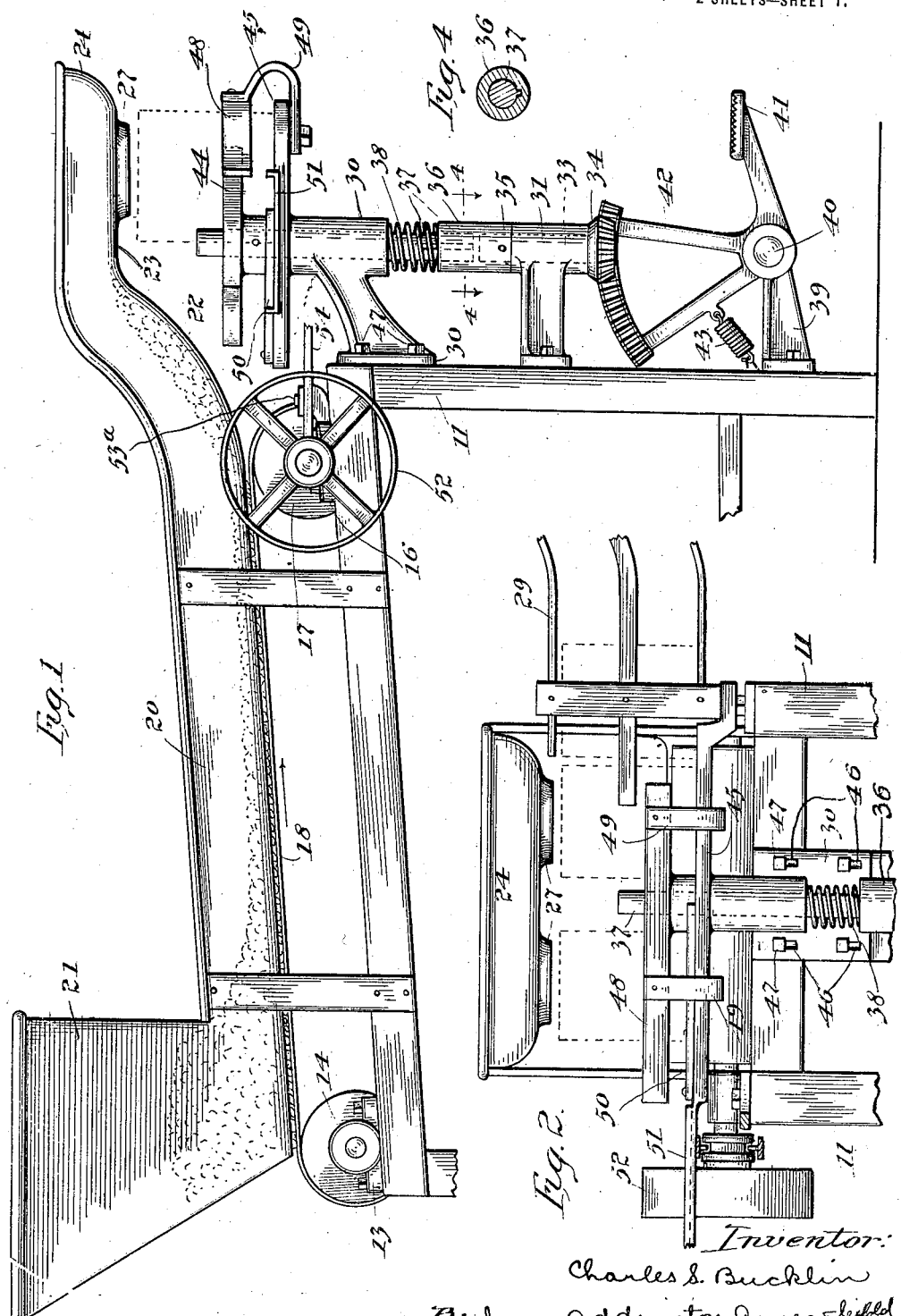

UNITED STATES PATENT OFFICE.

CHARLES S. BUCKLIN, OF RED BANK, NEW JERSEY, ASSIGNOR TO SPRAGUE CANNING MACHINERY COMPANY, OF CHICAGO, ILLINOIS, A CORPORATION OF ILLINOIS.

HAND-PACK-FILLING MACHINE.

1,335,819.   Specification of Letters Patent.   Patented Apr. 6, 1920.

Application filed July 1, 1918. Serial No. 242,691.

*To all whom it may concern:*

Be it known that I, CHARLES S. BUCKLIN, a citizen of the United States, residing at Red Bank, in the county of Monmouth and State of New Jersey, have invented new and useful Improvements in Hand-Pack-Filling Machines, of which the following is a full, clear, concise and exact description, reference being had to the accompanying drawing, forming a part of this specification.

This invention relates to improvements in can-filling machines for use in hand packing of fruits, vegetables and the like.

It is recognized by those having knowledge of the canning business that hand filling has certain advantages over machine filling, especially in the case of such materials as whole tomatoes, which are very easily crushed and damaged. Hand filling, however, as usually carried out, is expensive because of the great amount of labor involved. It is the principal object of this invention to provide a machine which will facilitate the work of packing whole tomatoes and the like in cans, and in the use of which sanitary conditions are maintained and the materials operated upon are not subjected to treatment which would be likely to damage them or lessen their attractiveness to the consumer.

In the accompanying drawings—

Figure 1 is an elevational side view of the machine;

Fig. 2 is an elevational end view of the machine, with some of the lower portions of the latter broken away;

Fig. 3 is a plan view of the machine; and

Fig. 4 is a sectional detail view of the ratchet clutch which forms a part of the can-shifting means, the section being taken on the line 4—4 of Fig. 1, looking downward.

A suitable supporting frame 11 carries bearings 12 and 13 for a drum 14, and bearings 15 and 16 for a drum 17. These drums are located at opposite ends of the frame and support an endless belt or carrier 18. This belt forms the bottom or lower wall of a receptacle or trough having the stationary side walls 19 and 20. The rear end of this receptacle is formed as a hopper 21 for receiving the fruit or vegetables which are to be put into the cans.

The belt 18 is driven by the application of power to one of the drums 14 or 17, preferably the latter, as shown, the upper portion of the belt moving forward, or toward the right as seen in Fig. 1. Suitable means which will be described below are provided so that the belt may be stopped or started at the will of the operator.

The end of the receptacle which is opposite the hopper is formed by an inclined wall 22 which forms a barrier against which the fruit is urged as long as the belt 18 is in motion. This barrier is preferably curved at its lower end to meet the surface of the belt nearly parallel thereto and at its upper end curves over to a substantially horizontal position, so as to form a filling table 23 beneath which the cans to be filled are made to pass. The side walls 19 and 20 of the receptacle are continued up and along the sides of the barrier 22 and merge into an upwardly extending rim 24 with which the filling table 23 is provided at its front edge.

The filling table 23 is formed with two openings through which the fruit may drop into the cans. These openings, 25 and 26, may have around their edges downwardly extending flanges 27 and 28 which form short funnels to direct the fruit into the open tops of the cans. As the fruit is brought by the carrier 18 to the barrier 22 it is forced upwardly along the latter and may be drawn forward upon the filling table 23 by the hand of the operator and caused to fall through the openings 25 and 26 into the cans.

The mechanism for conveying the cans to and positioning them in register with the openings in the filling table is adapted to operate on two cans each time the mechanism is actuated. Extending from one side of the machine is an upwardly curved gravity chute 29 in which the cans are placed. As the cans pass into the machine from this chute they are received by the can-positioning means which will now be described.

Secured to the front end of the frame of the machine are two bearing brackets 30 and 31, arranged one above the other. Supported by and turning in the lower bracket 31 is a vertically arranged shaft 33 having at its lower end a bevel pinion 34, the latter being keyed or pinned fast upon the shaft 33. The upper end of the shaft 33 carries one member 35 of a ratchet clutch, this member being fast on the shaft and coöperating with a complementary member 36 which has a sliding motion on but turns with a shaft 37. This shaft is supported by and turns in the bearing 30. The upper or sliding member 36 of the clutch is urged downward and into engagement with the lower member 35 by a coil spring 38 which is seated against the lower end of the bearing 30.

A suitable bracket 39 supports a short shaft 40 upon which is carried a foot-lever or treadle 41 and a bevel gear segment 42. This segment meshes with the pinion 34. When the treadle 41 is depressed by the operator the segment 42 gives to the pinion 34 an angular movement of 180 degrees or one-half of a complete revolution. A spring 43 is provided to return the treadle and segment to normal position. When this occurs the member 36 of the clutch rises and permits the member 35 to pass under it. Upon each depression of the treadle and its return to normal position the shaft 37 is thus given a half turn.

Upon the upper end of the shaft 37 is secured a can-feeding star wheel 44 having four points or projections which pass successively between the cans as they come to it from the gravity chute 29. These points are each curved toward one side to partially embrace a can, and the star wheel is so positioned on the shaft with respect to the clutch that when the parts are in normal position two cans will be in position in register with the filling openings 26 and 27.

The cans, as they pass in succession from the gravity chute 29 to the star wheel 44, are supported by a table 45 which is carried by the bracket 30. This bracket has a certain amount of vertical adjustment to permit of its being arranged to suit cans of different heights. As shown, this adjustment is provided for by elongating the holes 46 in the bracket 30 through which pass the bolts 47 which hold the bracket in position on the frame of the machine. As the cans are carried around by the wheel they are prevented from being thrown off the table by a curved guard 48 which is supported on the table by suitable brackets 49 and is substantially concentric with the star wheel.

A bar 50 is secured at one end to the frame and projects into the path of the cans as they are swept around by the star wheel. This bar directs the cans into a discharge chute 51, from which they pass out of the machine.

In order that the stopping and starting of the machine may be under the control of the operator a hand-operated clutch is provided between the power pulley 52 and the shaft 52ª of the drum 17. This clutch may be of any suitable form and is designated 53 in the drawing. It is coupled and uncoupled by the shifting of a lever 54 which is fulcrumed at 53ª on a bracket 54ª which is secured to the frame of the machine. This clutch lever extends forward to a position where it is readily accessible to the operator when she stands or sits at the end of the machine.

This machine, while simple in its construction, permits the operator to work rapidly and with very little danger of crushing or otherwise injuring the fruit. The operations of bringing the cans into position for filling and moving them out of the way after they are filled are executed with a minimum expenditure of time and effort on the part of the operator.

The operation of the machine may be briefly stated as follows: The operator stands at the end of the machine which is toward the right hand in Fig. 1. The tomatoes or other "fruit," which have been washed and peeled, are dumped into the hopper 21 at the opposite end of the machine. A supply of cans having been placed in the gravity chute 29 at the right hand of the operator, the power is thrown on by means of the lever 54. The upper portion of the belt carrier 18 moves toward the operator, carrying with it a portion of the contents of the hopper. The layer of fruit riding upon the carrier tends to travel up along the inclined barrier 22, being urged upward by the fruit which is following on the carrier. The operator depresses the foot treadle 41 and permits it to rise again. By this movement she causes the rotary sweep or star wheel 44 to bring two cans to filling position on the table 45 in register with the openings 25 and 26 in the horizontal filling table 23. The operator now reaches forward and with her hands draws toward her and onto the horizontal filling table a quantity of the fruit which is piled up against the barrier 22. By the proper motions she is able to direct a suitable quantity of the fruit into each of the filling openings 25 and 26, where it drops through into the cans below. By again depressing the treadle 41 and permitting it to rise the two cans just filled are swept off the can table 45 and are directed into the discharge chute 51, the same movement of the star wheel 44 bringing two more cans into filling position. This may be repeated and the work of filling the cans may proceed as long as the supply of fruit in the hopper is kept replenished and cans are supplied to the gravity can chute 29. The forward movement of the belt carrier 18 may be stopped at any time by the operator by simply throwing over the lever 54.

Of course, it is to be understood that this description and the accompanying drawings set forth only one constructional form in which my invention may be embodied, and that changes may be made without departing from the spirit of the invention or the scope of the claims.

If desired, the tension of the belt or carrier 18 may be so slight that the drum 17 will not drive it if the operator stops work and ceases to remove the fruit which piles up against the barrier 22, the additional resistance due to this piling up of the fruit and the consequent stoppage of the travel of the tomatoes causing the drum 17 to slip on the belt.

What I claim is—

1. In a device of the class described, a fruit receptacle having a movable support on which the fruit rests, and a barrier against which said support urges the fruit, said barrier being located and constructed to prevent the fruit from being carried past it by said movable support.

2. In a device of the class described, a fruit receptacle having a movable support on which the fruit rests, a barrier against which said support urges the fruit, said barrier being located and constructed to prevent the fruit from being carried past it by said movable support, and means for supplying cans adjacent said barrier, that part of said receptacle adjacent the barrier being open and accessible to an operator standing at the side thereof, whereby the operator can take the fruit restrained by said barrier and cause it to enter the cans.

3. In a device of the class described, a fruit receptacle having a movable support comprising an endless belt on which the fruit rests, and a barrier against which said support urges the fruit, said barrier being located and constructed to prevent the endless belt from carrying the fruit past it.

4. In a device of the class described, a fruit receptacle having a movable support comprising an endless belt on which the fruit rests, and a barrier adjacent one end of said belt and extending transversely thereof against which said support urges the fruit.

5. In a device of the class described, a fruit receptacle having a movable support on which the fruit rests, a barrier against which said support urges the fruit, said barrier being located and constructed to prevent the movable support from carrying the fruit past it, means for supplying cans adjacent said barrier, and fruit-guiding means adjacent the path of the cans, that part of the receptacle adjacent the barrier being open and accessible to an operator standing beside it, whereby the operator can take the fruit restrained by said barrier and direct it through said fruit-guiding means to cause it to enter the cans.

6. In a device of the class described, a fruit receptacle, a movable support on which the fruit rests, a barrier against which said support urges the fruit, said barrier being located and constructed to prevent the movable support from carrying the fruit past it, means for supplying cans adjacent said barrier, and a table having an opening beneath which the cans move, that part of the receptacle adjacent the barrier being open and accessible to an operator standing beside it, whereby the operator can take the fruit restrained by said barrier and direct it through said opening into said cans.

7. In a device of the class described, a fruit receptacle having a movable support on which the fruit rests, a barrier against which said support urges the fruit, said barrier being located and constructed to prevent said movable support from carrying the fruit past it, intermittently-actuable means for positioning cans adjacent said barrier, and a table having an opening beneath which the cans move successively, said receptacle being open and accessible to an operator standing beside it, whereby the operator can take the fruit restrained by said barrier and direct it through said opening into said cans.

8. In a device of the class described, a fruit receptacle having a movable support on which the fruit rests, a barrier against which said support urges the fruit, said barrier being located and constructed to prevent the movable support from carrying the fruit past it, and means for supplying cans adjacent said barrier, said receptacle being open and accessible to an operator standing beside it, whereby the operator can take the fruit restrained by said barrier and cause it to enter the cans, said supply means comprising a supply chute and a foot-operated sweep arranged to position an empty can and to simultaneously remove a filled can.

9. In a device of the class described, a fruit receptacle having a movable support on which the fruit rests, a barrier against which said support urges the fruit, said barrier being located and constructed to prevent the movable support from carrying the fruit past it, and means for supplying cans adjacent said barrier and for positioning the cans with respect to said barrier.

10. In a device of the class described, a fruit receptacle having a movable support on which the fruit rests, a barrier against which said support urges the fruit, said barrier being located and constructed to prevent said movable support from carrying the fruit past it, and means for supplying cans adjacent said barrier, said means including a support and a rotatable sweep for engaging the cans to position them and to remove them from said support.

11. In a device of the class described, a receptacle, a movable support upon which the fruit rests, a filling table above the level of the movable support, said filling table having an opening therein, and an inclined barrier extending from the movable support to the filling table, said movable support being arranged to urge the fruit upward on said barrier, said barrier being located and constructed to prevent the fruit from being carried past it, and said receptacle being open and accessible to an operator standing beside it, whereby the operator can draw the fruit onto the filling table and direct it to the opening therein.

12. In a device of the class described, a fruit receptacle having a movable support comprising an endless belt on which the fruit rests, and a receiver for the fruit, to which receiver the fruit is supplied from said belt, the receiver being so located with respect to said belt that the fruit will pile up on the receiver and prevent any more fruit from being supplied to the receiver until some of the fruit is removed therefrom.

In witness whereof, I have hereunto subscribed my name.

CHARLES S. BUCKLIN.

Witness:
MARGARETTA E. CARTON.